United States Patent
Stauffer et al.

(10) Patent No.: US 6,418,177 B1
(45) Date of Patent: *Jul. 9, 2002

(54) FUEL PELLETS FOR THERMONUCLEAR REACTIONS

(76) Inventors: John E Stauffer; John C. Stauffer, both of Six Pecklands Rd., Greenwich, CT (US) 06830

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,432

(22) Filed: Feb. 26, 1997

Related U.S. Application Data

(63) Continuation-in-part of application No. 07/887,107, filed on May 19, 1992, now abandoned, which is a continuation-in-part of application No. 07/427,245, filed on Oct. 25, 1999, now abandoned, which is a continuation-in-part of application No. 07/103,183, filed on Sep. 30, 1987, now abandoned, which is a continuation-in-part of application No. 06/735,869, filed on May 20, 1985, now abandoned, which is a continuation-in-part of application No. 06/639,252, filed on Aug. 9, 1984, now abandoned.

(51) Int. Cl.$^7$ ................................................. G21B 1/00
(52) U.S. Cl. ....................................................... 376/152
(58) Field of Search ................................. 376/157, 915, 376/916; 264/4.6, 4.3, 8, 9, 13, 14, 0.5, DIG. 6

(56) References Cited

U.S. PATENT DOCUMENTS

| 4,133,854 A | * | 1/1979 | Hendricks, I |
| 4,224,261 A | * | 9/1980 | Halpern |
| 4,263,095 A | * | 4/1981 | Thode |
| 4,279,632 A | * | 7/1981 | Frosch et al. |
| 4,290,847 A | * | 9/1981 | Johnson et al. |
| 4,322,378 A | * | 3/1982 | Hendricks, III |
| 4,430,933 A | * | 2/1984 | Teitel et al. |
| 4,525,323 A | * | 6/1985 | Bangerter et al. |
| 4,548,767 A | * | 10/1985 | Hendricks, II |
| 4,568,418 A | * | 2/1986 | Walko et al. |

OTHER PUBLICATIONS

UCRL-77725, Nuckolls, pp. 1–6, May 17, 1976.*
AICHE Symposium Series, vol. 75, No. 191, pp. 201–206, Halpern et al, Dec. 6, 1979.*

* cited by examiner

Primary Examiner—Harvey E. Behrend
(74) Attorney, Agent, or Firm—Patton Boggs LLP

(57) ABSTRACT

Fuel pellets for use as targets in a device employing thermonuclear fusion by inertial confinement (Laser fusion) are manufactured from high polymer hydrocarbons in which bound hydrogen has been replaced with tritium. The required polymer is prepared by polymerizing monomer(s) which contain carbon and tritium. The hollow pellets are filled with thermonuclear fuel, e.g., a mixture of deuterium-tritium. To improve the sphericity of the pellets and the uniformity of their wall thickness, manufacture of the pellets is contemplated in the near-zero gravity of space.

1 Claim, 3 Drawing Sheets

FUEL PELLETS FOR THERMONUCLEAR REACTIONS

RELATED APPLICATIONS

This application is a Continuation-In-Part of U.S. Ser. No. 07/887,107, filed May 19, 1992 now abandoned, entitled "FUEL PELLETS FOR THERMONUCLEAR REACTIONS" which was a Continuation-In-Part of U.S. Ser. No. 07/427,245, filed Oct. 25, 1989 now abandoned, entitled "FUEL PELLETS FOR THERMONUCLEAR REACTIONS" which was a Continuation-In-Part of U.S. Ser. No. 07/103,183, filed Sep. 30, 1987 now abandoned, entitled "PROCESS FOR MAKING HOLLOW PLASTIC FUEL PELLETS FOR THERMONUCLEAR REACTORS" which was a Continuation-In-Part of U.S. Ser. No. 06/735,869 filed May 20, 1985 now abandoned, entitled "FUEL PELLETS FOR USE IN FUSION REACTORS" which was a Continuation-In-Part of U.S. Ser. No. 06/639,252, filed Aug. 9, 1984 now abandoned entitled "FUEL PELLETS FOR USE IN FUSION REACTORS". The above applications are incorporated herein by reference.

TECHNICAL FIELD

This invention relates to fuel pellets for use as targets in a device employing thermonuclear fusion. The invention further relates to high polymer hydrocarbons in which tritium has been substituted for bound hydrogen. And finally the invention relates to the manufacture of pellets in the microgravity environment of space.

BACKGROUND ART

Hollow gas-filled glass or metal spheres or target pellets are known (see Wang and Elleman, U.S. Pat. No. 4,344,787, "Method and Apparatus for Producing Gas-Filled Hollow Spheres"). Molten material is forced from a nozzle by a piston while a high-pressure gas fills the center of the liquid column as it emerges from the pipe. The molten material emerges into a gas-filled environment and breaks into hollow spheres.

Nuckolls et al., U.S. Pat. No. 4,376,752, "Foam Encapsulated Targets" uses a similar process to fabricate glass or metal target pellets containing thermonuclear fuel. However, vibrations are applied to the extruded tube to assist its breakup into uniform hollow bodies. Teitel et al., U.S. Pat. No. 4,432,933 discloses the use of not only glass and metal but also ceramic, carbon and plastic in manufacturing hollow microspheres for application in thermonuclear fusion reactors.

SUMMARY OF INVENTION

The present invention utilizes high polymer hydrocarbons in which bound hydrogen has been replaced by tritium, an isotope of hydrogen, as shell materials for fuel pellets to be used in thermonuclear fusion devices employing inertial confinement. The required high polymer can be produced from monomer(s) in which hydrogen has been replaced by tritium. Pellets fabricated from tritium substituted high polymer are filled with thermonuclear fuel.

Because the chemistry of hydrogen and tritium are similar, all plastics are capable of such substitution whereby bound hydrogen has been replaced by tritium. Thermoplastics, however, are favored in the present invention because of their relative ease of fabrication into pellets. Nevertheless there are no inherent reasons why thermosetting resins cannot be employed. The thermoplastics of greatest interest include such polymers are polyolefins, polystyrene, polyamides, polyesters, acetal copolymers, polyacrylonitrile, and aromatic polyamides/imides.

Plastics possess many properties that make them attractive for use in target pellets. These properties determine not only the success with which a given plastic can be fabricated into a fuel pellet but also the performance of the pellet so formed. Properties of a given plastic which must be considered include the following attributes: strength to weight ratio, toughness, tensile strength, optical clarity, chemical resistance, thermal stability, resistance to radiation degradation, solvent resistance, gas permeability, flammability, mass density, and products of decomposition.

One factor which is critical in selecting a material for use in fabricating target pellets is its average atomic number, or Z number.

Theoretical and experimental results indicate that materials with low Z numbers are preferred. This consideration makes plastics more attractive than other materials. The lower effective atomic number of plastics provides a relatively more efficient utilization of the incident radiation and therefore promises greater energy gain, defined as the ratio of the fusion energy produced to the input radiation energy (commonly laser beams).

The conscious substitution of tritium for hydrogen in plastic used for target pellets is based on a consideration of its nuclear properties. First, both tritium and hydrogen have the same Z number so that such a substitution will not affect the average atomic number of the plastic. Second, tritium is a component of deuterium-tritium (D-T) mixtures, the most promising fuel for thermonuclear fusion. By contrast, hydrogen is a poor fuel for fusion, requiring, by orders of magnitude, greater temperatures to ignite. Third, compared with hydrogen, the tritium nucleus has very close to triple the mass. And fourth, whereas tritium does not absorb neutrons, hydrogen possess a neutron cross section of 0.33 barns.

To understand the significance of the differences in nuclear properties between tritium and hydrogen, one must consider the mechanism of an implosion. When fuel pellets fabricated from a conventional plastic are subjected to intense radiation such as laser beams, the plastic instantly becomes a plasma. All chemical bonds are broken and electrons are disassociated from atomic nuclei. Because the hydrogen nuclei (protons) are much lighter than the carbon nuclei (or other nuclei), the former will diffuse more rapidly into the D-T fuel mixture and thereby compress it. In order to achieve the most efficient compression, they front of the imploding plasma needs to be as symmetrical as possible.

Any effects which reduce the symmetry of the imploding front have been demonstrated to reduce the compression of the fuel. In an experiment carried out at Lawrence Livermore National Laboratory, an applied 15 percent asymmetry to produce a pancake configuration of the fuel resulted in a 40-fold drop of the neutron yield (*E & TR*, July–August, 1988, p. 34). Thus, measures are taken to fabricate targets as symmetrical as possible and to subject the targets to laser beams arranged in a circumferentially uniform pattern.

Another potential source of asymmetry comprises the instabilities set up along the imploding plasma front. As an example, Raleigh-Taylor instabilities may be formed at boundaries between materials of different masses. If a heavy material is accelerated against a light material, the boundary between the two will be stable. But if a light material is accelerated against a heavy material, the boundary between the two will be unstable and turbulent, causing the two materials to mix in a way extremely difficult to predict. Therefore, one can expect instabilities to result when protons are accelerated against a D-T mixture, but substitution of tritium nuclei for protons would mitigate any such effect.

Whatever tritium might become commingled with the D-T fuel would have far less effect than protons. The latter, as pointed out, is a poor fuel for fusion and therefore would have the effect of diluting the reactants. Tritium, on the other hand, can react with the fuel as if it were part of the original fuel mixture. At most, a compensation in the ratio of the D-T fuel components might be needed.

Once ignited, the D-T fuel gives off a profusion of neutrons as fusion occurs. These neutrons are not required in the reaction, and, if anything, serve only to dilute the reactants and slow the reaction. Thus, the neutrons should be allowed to escape from the reaction zone. Pellet materials with low cross sections such as carbon will least impede the outward diffusion of neutrons. Likewise, neutrons should interfere less with an imploding front of tritium than with protons.

Because tritium is radioactive, with a half life of 12.3 years, it will slowly decay. As a result, any plastic containing bound tritium will gradually disintegrate. Obviously, this effect is undesirable, but it is not as critical as it might seem. Resins whose skeletons contain carbon-carbon linkages are less prone to rupture than those containing carbon-oxygen or other bonds. Therefore, hydrocarbon polymers would be preferred. In this case, tritium decay would lead primarily to the formation of free radicals and cross-linking between polymer chains.

Hydrocarbon polymers are preferred for another reason as well as their radiation resistance. Having a lower average Z number they promise greater energy gain. First consideration therefore is given to such volume-produced hydrocarbon resins as polyethylene, polypropylene and polystyrene. Tritium can be substituted for hydrogen in these plastics by using organic syntheses to prepare the corresponding monomers starting with tritium oxide as a source of tritium. Monomers can also be prepared by isotope exchange. The substituted polyolefins have an advantage over substituted polystyrene in that the ratio of T/C is 2:1 instead of 1:1 thus providing a lower average Z number. On the other hand, polystyrene, because of its aromatic structure, has been shown to be more radiation resistant.

The hydrocarbon resins are soluble in common solvents and therefore can be processed by solvent casting techniques. Conventional processes may be applied to the fabrication of fuel pellets, but to achieve superior results, manufacture in space or near zero gravity is recommended. In this manner, pellets will be provided with improved sphericity and concentricity, both of which are essential to their use. A symmetrical shell will not only create a higher energy gain but can also withstand higher gas pressures. Manufacture in space will also produce greater uniformity of pellets so that fewer rejects will be produced.

In summary, fuel pellets are made in a process that begins by producing monomers containing exclusively carbon and tritium. These monomers can be prepared by chemical synthesis. Alternatively, such monomers can be prepared by isostope exchange whereby tritium is substituted for hydrogen in the corresponding monomer. This reaction is known as the Wilzbach exchange.

Monomers that can be made by such means include tritium substituted ethylene, propylene, butene, butadiene, styrene and pentadiene. These compounds as well as other hydrocarbon monomers are polymerized by methods well known in the art. Either homopolymers or copolymers can be produced.

The resulting high polymer hydrocarbon, containing only carbon and tritium, is formed into rigid, hollow pellets that are substantially spherical in shape and have walls of uniform thickness and density. This means that the wall of each pellet is a continuous solid phase of high polymer hydrocarbon.

Pellets, once formed, can be treated by means known to the art to cross link the polymer chains. Improved physical properties may be obtained by such cross linking. Prior to use, pellets are filled with thermonuclear fuel. When blowing microballoons it is possible to introduce the fuel during the fabrication step, but the preferred way is to fill the pellets after they have been formed.

OBJECTS OF THE INVENTION

It is therefore an object of the present invention to produce high energy gain fuel pellets for use in thermonuclear fusion reactors employing inertial confinement at sufficiently low cost to allow their commercial exploitation.

Another object of the invention is to produce fuel pellets having uniform shell thickness and density.

Still another object of the invention is to produce fuel pellets that are spherically symmetric so as the yield is not reduced by nonuniform compression.

It is still another object of the invention to provide fuel pellets which, when imploded, will avoid instabilities between the imploding front and the fuel.

It is still another object of the invention to provide fuel pellets of maximum durability.

It is still another object of the invention to provide fuel pellets that will provide the most efficient distribution of energy yield when exposed to laser beams.

Other objects of the invention will impart the obvious and will in part appear hereinafter. The invention accordingly comprises several steps and the relation of one or more of said steps with respect to each of the other and the articles possessing the features, properties, and the relation of elements, which are exemplified in the articles and processes herein described. The scope of the invention is indicated in the claims.

BRIEF DESCRIPTION OF THE DRAWINGS

For a fuller understanding of the nature and objects of the invention reference should be had to the following detailed description taken in connection with the accompanying drawings, in which.

The same reference characters refer to the same elements throughout the several views of the drawings.

BEST MODE FOR CARRYING OUT THE INVENTION

Figure 1:
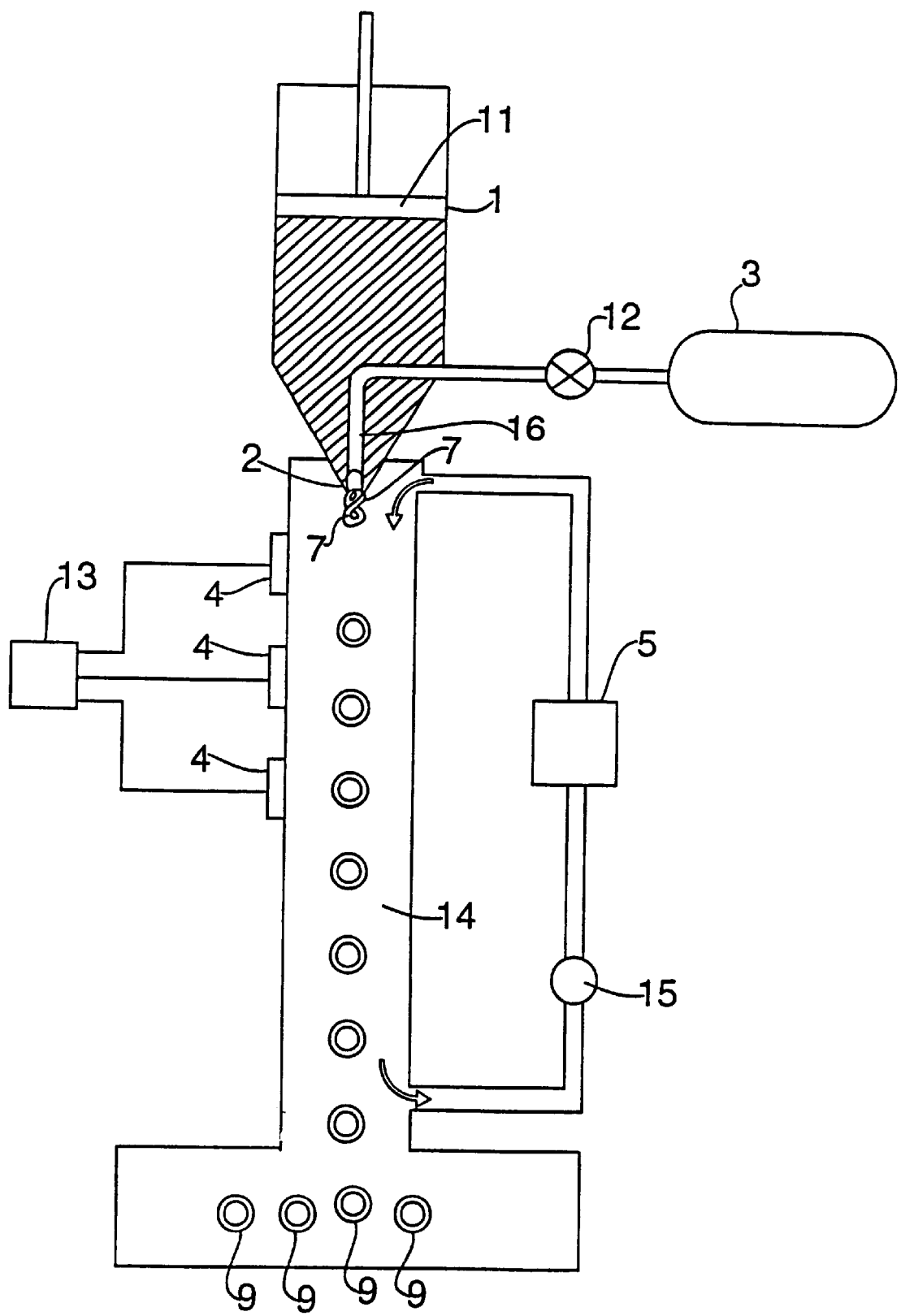
FIG. 1 is a diagramatic view of an apparatus for producing polymeric target pellets according to the invention.

Referring to FIG. 1, polymer dope is fed by positive displacement to an extruder 1 where it is forced through die orifice 2 by piston 11. Said piston is schematic only, and in practice it may consist of two gear pumps operating at differential speeds, or a diaphram which is displaced by pressurized gas. When manufacture is contemplated in space, the lack of gravity must be taken into consideration in designing the metering system.

The polymer dope, selected to illustrate this process, consists of tritium substituted polystyrene dissolved in a suitable solvent. Many organic compounds have been reported as solvents for polystyrene and a related resin, poly a-methyl styrene. They include benzene, toluene, xylene, ethylbenzene, chlorobenzene, tertiary butyl benzene, isopropyl benzene, triphenyl methane, heptane, butyl acetate, methyl ethyl ketone, chloroform, carbon tetrachloride, tetrahydrofuran, carbon disulfide, and ethyl chloride. Preferred solvents should possess (1) good solvency, (2) low heat of vaporization, (3) ease of handling and (4) radiation resistance. Besides being readily soluble, tritium substituted polystyrene has a number of other advantages. It is resistant to radiation damage and it possesses a relatively low average atomic number (Z number). Tough, clear, cellophane-like films can be prepared from tritium substituted polystyrene with good chemical and physical properties. A particular form of this resin, isotactic polystyrene in which tritium is substituted for hydrogen, is of interest because of its predictable elevated melting point.

Compressed gas 3 is metered at 12 into the center of the extrusion. An inert gas such as hydrogen, deterium, helium, nitrogen, carbon dioxide, air, fluorocarbon or any combination of these gases may be used. Subsequently, in another location, e.g. on earth, and shortly before use, the gas in the pellets can be exchanged for the required D-T fuel. Because of the permeability of plastic materials, the exchange of gases can be achieved by means of diffusion. The inert gas in each pellet will diffuse outward through the pellet wall as D-T diffuses into the pellet from the surrounding medium. A pressurized tank can be used for the above operation. By means of hyperbaric pressures the D-T charge can be increased over the amount in equilibrium at one atmosphere.

Figure 4:
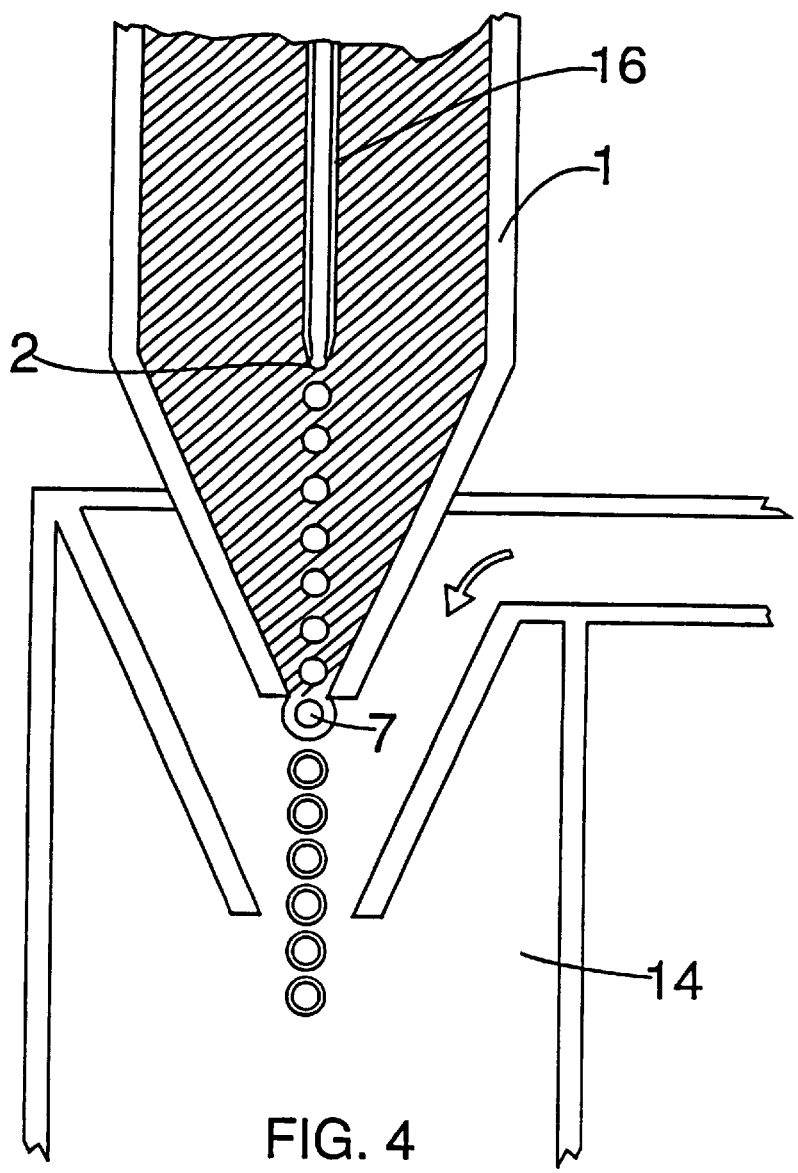
FIG. 4 is a diagramatic view of the extruder orifice showing design details.

The gas is introduced into the polymer dope through a hypodermic needle. The size of the bubbles is proportional to the orifice diameter. The needle must be perfectly centered in order to obtain symmetrical pellets. Because of the difficulty in centering the needle, it may be partly withdrawn from the tip of the extruder as shown in FIG. 4. Thus, a slight misalignment of the needle results in a smaller deviation as a percent of the extruder diameter. Since the flow of the dope is lamina;, the bubbles will move in a straight line. Because of the buoyancy of the bubbles, this scheme is best suited for operation in near zero gravity.

Transducers 4 driven by driver 13 apply acoustical vibrations which have a frequency close to the natural frequency at which the extruding polymer rod tends to break up. This frequency can be estimated by the well-known Rayleigh equation or determined experimentally. The amplitude or strength of the vibration can be varied as needed. An additional effect helps to form drops from the extruded rod. A disruptive force is provided by the relative motion between the rod and surrounding gas. The relative flow rates can be altered by modifying the cross section of chamber 14 as shown in FIG. 4. As this drag effect becomes more important the contribution from the transducers can be reduced or eliminated.

The preferred fuel for laser fusion is a combination of Deuterium and Tritium (D-T). An examination of rates for certain fusion reactions shows that D-T reactions occur with roughly 100 times the probability of its nearer competitor over the range of anticipated ion temperatures (0–10 Kev.). Thus the D-T fuel is the best to employ. The D-T fuel in the pellet is compressed to extremely high densities ($103-10^4$ times liquid density) by laser produced converging shock waves which also ignite a small portion of the compressed core. In the D-T thermonuclear reaction, alpha particles and neutrons deposit energy in the core, giving rise to a "boot strap" heating effect, and a propagating burn front. This burn front propagates through the core before the pellet has time to disintegrate, so that a significant fraction of the available fuel mass can burn.

So-called D-T fuel is actually made up of a mixture of the molecules, $D_2$, DT, and $T_2$. Rather than using such a mixture, this invention envisions the likely use of only DT that has been spin-polarized or as high a proportion of this molecule as is practical. It has been reported that DT better retains nuclear polarization which would provide an assist in igniting the fuel. Unfortunately, DT slowly breaks up into $D_2$ and $T_2$ because of the radiation given off by tritium. Therefore, fuel pellets should be consumed as soon as possible after they are charged with fuel.

The pellets are dried by removing the solvent as a portion of the gas surrounding the pellets in drying chamber 14 is recirculated by pump or blower 15 through an adsorbent 5. Activated carbon or silica gel has been found to be an effective adsorbent for many solvents. The rate of vaporization can be increased by applying heat to the pellets 9. The heat of vaporization of the solvent one way or another should be compensated for.

While the pellets 7 are still in a fluid or plastic state, the surface tension tends to form spherical inner and outer surfaces. In the environment of near zero gravity this effect is greater because drag effects from the surrounding gas can be reduced. The application of acoustical vibration, in addition to breaking the extruded rods into pellets, helps to achieve concentric inner and outer surfaces. This vibration increases molecular motion within the walls of the pellet.

The pressure of the gas external to the pellets 9 in chamber 14 is related to the pressure applied by piston 11 according to the following equation:

$$q = k \frac{\Delta p_D}{\mu_D}$$

where q is the flow rate of the dope, k is a constant established by the geometry of the die, $\Delta P_D$ is the pressure drop through the die, and $\mu_D$ is the viscosity of the dope in the die. The injected gas material at 12 must have a slightly higher pressure than the dope contained in the extruder 1. The gas flow rate may be controlled by a pressure reducer and a needle valve. There are no fundamental restrictions on the absolute pressure in chamber 14 except as imposed by the design of the apparatus. As previously noted, however, because of contemplated operation in space, the apparatus should be kept as light as possible and therefore design pressures must be limited to a few atmospheres at most. The pellets, in a subsequent process, may be pressurized in a tank, whereby not only is DT exchanged for the injected gas, but the gas can be equalized at some elevated pressure.

As the polymer rod leaves the die of the extruder it is observed to expand. This expansion will continue until the pressure of injected gas in the pellets equals the ambient pressure. Further expansion of the pellets can be achieved by heating them in a controlled or programmed manner as they are dried. Heat can be applied by means of infrared lamps located on the periphery of the drying chamber 14. As the temperature of the pellets is raised the vapor pressure of the solvent is increased. Using a modified form of Raoult's Law, Dalton's Law, and the Perfect Gas Law the equilibrium volume of the pellets can be estimated as follows:

$$V = \frac{nRT}{\pi - kP}$$

where n is the moles of inert gas in each pellet, R is the gas law constant, T is absolute temperature, $\pi$ is the ambient pressure in the drying chamber, k is the relative vapor pressure and P is the vapor pressure of the solvent. As the pellet walls become more viscous due to the loss of solvent, the equilibrium volume will not be attained, but instead some intermediate value will be realized.

As the pellets are expanded an important rheological effect is achieved in the plastic walls. This expansion of the wall of a pellet will tend to line up the polymer strands parallel to the wall. A similar effect will be achieved as when synthetic fibers are drawn to increase their strength. In the case of a pellet, the molecules become oriented in two dimensions resulting in what may be called "biaxial orientation." This change will contribute to significantly improved physical properties such as tensile strength and permeability.

The pellets 9 are kept separated from each other and the surface of the container 14 until they have hardened or cured. Gas jets (not shown) may be used to keep the pellets 9 separated until they have hardened. Sonic vibrations are also useful in this application, inasmuch as, these exert small forces.

A variation of the invention is that a final portion of the die orifice 2 may be rotated so that a spinning motion of the emerging bubbles will produce oblate spheroidal pellets which may be desirable in certain reactors. In space, the entire apparatus may be rotated to achieve this effect. As a corollary, rotation must be avoided in order to produce spherical pellets. The apparatus can be prevented from rotating about its axes by means of booster rockets or jets.

The above described method of manufacturing microballoons by extrusion is not unique and can be replaced by other fabricating techniques. For example, Bayless in U.S. Pat. No. 4,107,071 describes a process for microcapsules whereby a core material is encapsulated with a polymeric resin. The encapsulation is achieved in an agitated system comprising two phases, one of which is the core material and the other is the vehicle for the polymer. Upon induction of phase separation, the polymer forms a sheath about the capsule core material. Only one further step is required to convert the coated capsules produced by the Bayless process to microballoons. Leaching, or vaporization or dissolution of the core material through the semi-permeable coating would result in hollow pellets suitable for charging with thermonuclear fuel.

The Bayless process could be carried out in whole or in part in the near-zero gravity environment of space. As in the case of the extrusion process, pellets so produced would have improved symmetry. Already, in a noteworthy experiment, microscopic plastic beads have been produced in space that are not only more spherical than those manufactured on earth but also more uniform in size. (*Science News*, Aug. 10, 1985, pp. 92–93). Such beads could provide the core material for the Bayless process.

It is known that tritium will substitute for hydrogen in organic materials. However, complete substitution by this method is unlikely in polymeric materials. Therefore the preferred method of preparing tritium substituted high polymers is by starting with monomers in which hydrogen has been completely replaced by tritium. Starting with tritium oxide the preparation of tritium substituted polyethylene is shown below:

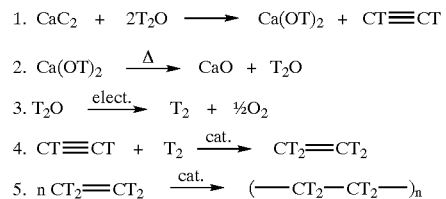

Likewise tritium substituted polystyrene can be produced making use of the classical Reppe chemistry. In this instance tritium substituted acetylene is reacted with a catalyst to produce styrene and benzene both containing only tritium. The benzene compound can be burned in order to recover the tritium values.

Tritium substituted polypropylene depends on the oxo reaction for its preparation. In this process an olefin (tritium substituted ethylene) is reacted with carbon monoxide and tritium to produce an aldehyde which is subsequently reduced to an alcohol. Dehydration of the alcohol produces tritium substituted propylene monomer.

Figure 5:
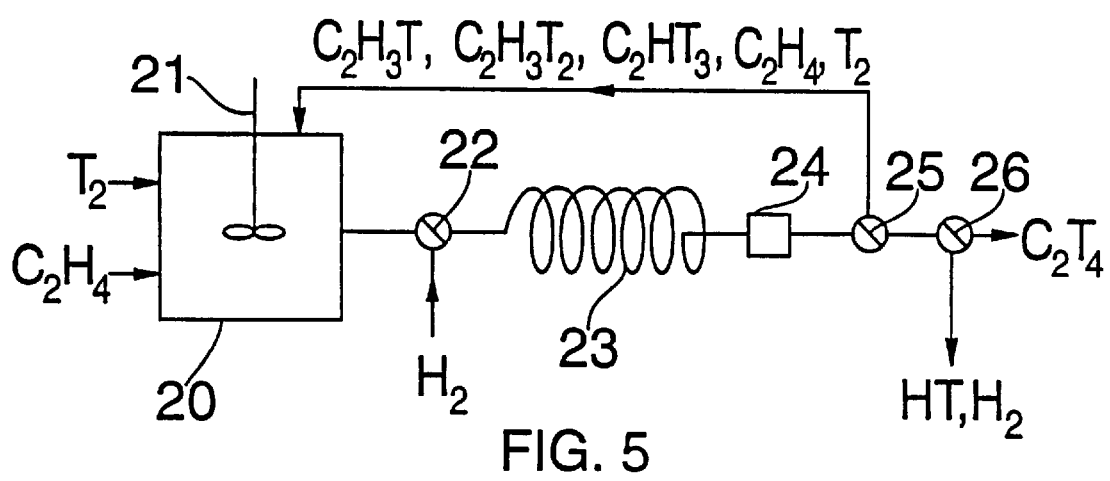
FIG. 5 is a schematic diagram of an apparatus for monomer preparation by isotope exchange.

Monomer preparation by isotope exchange is carried out in the apparatus shown in FIG. 5. Tritium gas and a hydrogen containing monomer, in this case ethylene, are fed into reaction vessel 10. Agitator 11 assures the intimate mixing of the two reactants. In order to increase production, the reaction can be run at pressures above one atmosphere. A product sample is withdrawn from the vessel and passed through gas chromatograph column 13 to separate the sample into its component fractions. Hydrogen gas is introduced into the column via three-way valve 12 in order to elute the sample. Each of the fractions is identified by detector 14. Two three-way valves 15 and 16 divert the fractions to the proper lines. The valves are automatically operated by a controller (not shown) which receives a signal from the detector. Purified product, tritiated ethylene, is collected for subsequent polymerization. Reactants and partially substituted monomers are recycled to the reaction vessel, while tritium values are recovered from the hydrogen before the latter is discarded.

Pellets produced by the invention may have varying dimensions. The outside diameter can range from 50 micrometers to 1 cm. and the wall thickness from 0.5 micrometer to 1 mm., however, these values are not meant to be limiting. The strength of the pellet, and thus the maximum pressure of the fuel gas, will depend on the tensile strength of the wall, the diameter of the pellet, and the wall thickness. Pellets produced in near-zero gravity of space can be expected to possess a non-concentricity of less than 5 percent and asphericity of under 3 percent. Those pellets, however, produced on earth cannot be expected to equal the ones produced in space with respect to symmetry or uniformity.

Although it is possible to manufacture hollow spheres under normal gravitational conditions on earth, low or zero gravitational conditions help to reduce nonconcentricity and deformation. In the case of large gas-filled spheres, the gas bubble within the sphere has a tendency to rise toward the top of the sphere in a gravitational environment.

Figure 2:
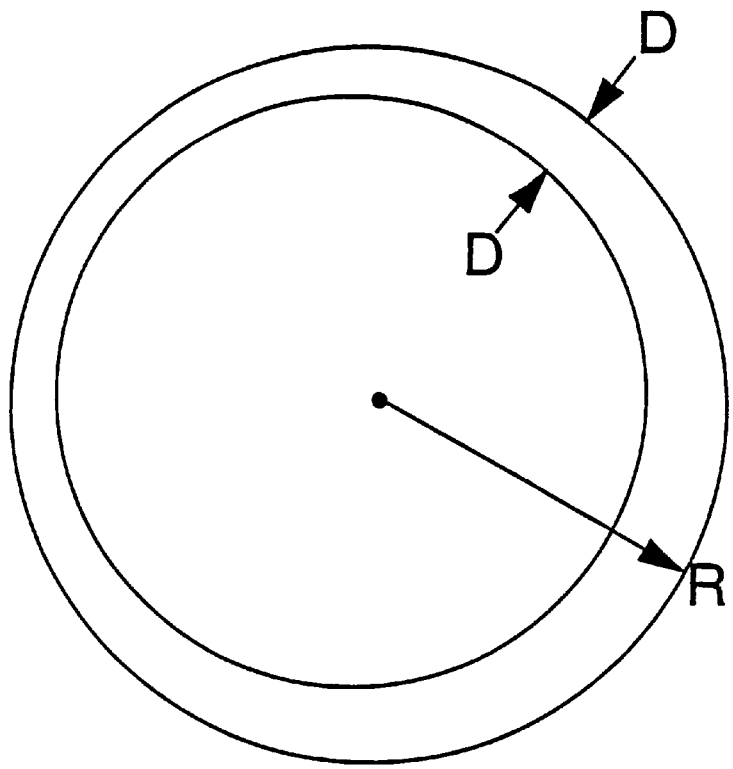
FIG. 2 is a drawing of a target pellet having non-concentric wall thickness at D/D.

A zero-gravity environment helps to avoid deformations that can be produced by rapid gas movements past the sphere as it falls. This resistance tends to distort the shell, especially one which is relatively large, producing significantly reduced concentricity (FIG. 2, D—D) and non-spericity of the shell (not shown). Low gravity of less than one tenth gravity at the surface of the earth may be considered zero gravity for the purposes of this process.

Figure 3:
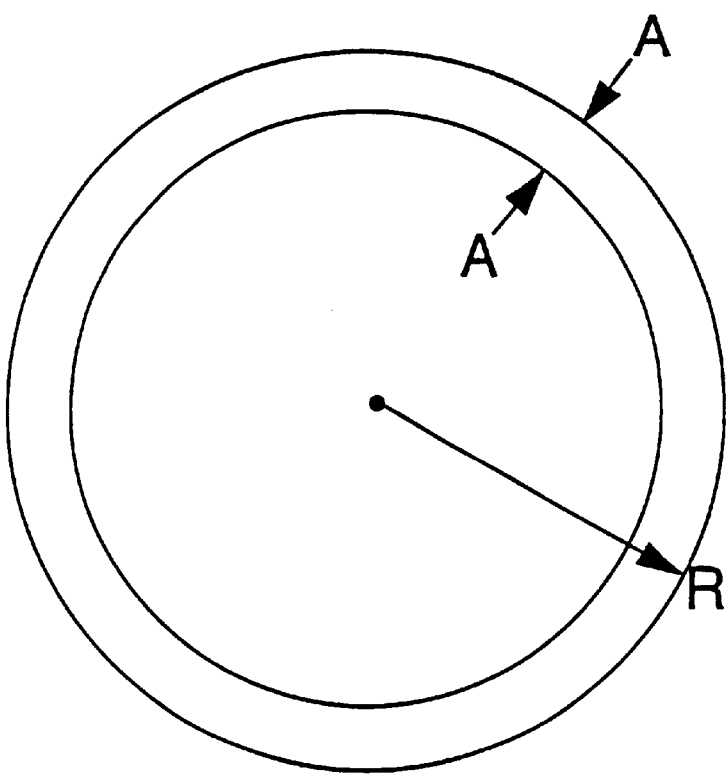
FIG. 3 is a diagramatic view of a polymeric target pellet according to the invention, having concentric wall thickness as shown at A/A.

A uniform wall thickness, FIG. 3, A—A, not only creates a higher energy yield, but also withstands higher pressures so that more fuel, usually DT, can be stored inside each sphere.

Pellets, which are as described, may be subsequently coated with so-called pusher and/or ablator layers. These coatings are designed to increase the efficiency of the incident beams. Alternatively, the pellets may be used in a reactor that contains a gaseous atmosphere rather than being completely evaluated. For example, helium under low pressure would absorb some of the laser energy, but a controlled amount would reach the target. Being monoatomic, helium would absorb less laser energy than, for example, hydrogen would. Since the intensity of the beams is inversely proportional to the square of the reactor radius, most of the energy absorbed by the helium would be adjacent to the target. The helium in effect would function as an ablator.

Fuel pellets made by the present invention possess unique properties which make them suited for use in devices employing thermonuclear fusion by inertial confinement. Such pellets, however, cannot be used for thermonuclear fusion by magnetic confinement because of the carbon impurities which would be introduced into the plasma. In fusion by magnetic confinement, feasibility studies have proposed the use of frozen deuterium/tritium pellets, the size of sand grains, which are injected at very high speed into the plasma. (*Power*, May 1982, p. 32) Experiments at MIT with the Alcator C Tokamak have confirmed the practicality of this concept. (*Space Calendar*, Nov. 21–27, 1983, p. 3).

It will thus be seen that the objects set forth above among those. made apparent from the preceding description are efficiently attained, and, since certain changes may be made in carrying out the above processes and in the above described articles without departing from the scope of the invention, it is intended that all matter contained in the above description or shown in the accompanying drawings, shall be interpreted as illustrative and not in the limiting sense.

It is also to be understood that the following claims are intended to cover all of the generic and specific features of the invention hereinafter described, and all statements of the scope of the invention, which, as a matter of language, might be said to fall therebetween.

What is claimed is:

1. A pellet for use as a target in a device that produces thermonuclear fusion by inertial confinement, said pellet made by a process comprising the following steps:

A. preparing monomers which contain exclusively carbon and tritium;

B. polymerizing said monomers to produce a high polymer hydrocarbon containing only carbon and tritium, and C. forming a rigid, hollow pellet from said high polymer hydrocarbon by means of rotation that is spheroidal in shape and has a wall containing only carbon and tritium.

* * * * *